Figure 6:
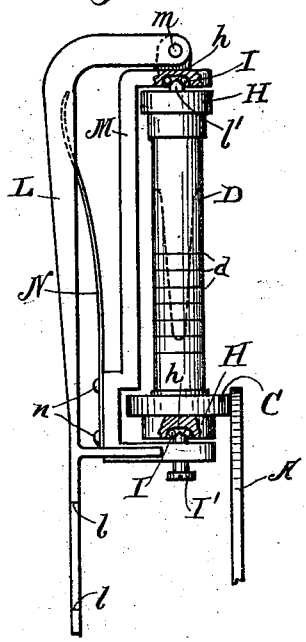

(No Model.)

A. B. HOLSON.
SPEED INDICATOR.

No. 561,052. Patented May 26, 1896.

Witnesses:
R. J. Jacker.
Flora L. Brown.

Inventor:
Albert B. Holson.
By Charles Turner Brown,
Atty.

UNITED STATES PATENT OFFICE.

ALBERT B. HOLSON, OF CHICAGO, ILLINOIS, ASSIGNOR TO THE HOLSON MANUFACTURING COMPANY, OF SAME PLACE.

SPEED-INDICATOR.

SPECIFICATION forming part of Letters Patent No. 561,052, dated May 26, 1896.

Application filed July 20, 1895. Serial No. 556,641. (No model.)

*To all whom it may concern:*

Be it known that I, ALBERT B. HOLSON, a resident of Chicago, in the county of Cook and State of Illinois, have invented certain new and useful Improvements in Pace-Indicators, of which the following, when taken in connection with the drawings accompanying and forming a part hereof, is a full and complete description, sufficient to enable those skilled in the art to understand, make, and use the same.

The primary purpose of this invention is to obtain an instrument simple in construction, light in weight, and not liable to get out of order which can be readily attached to a bicycle and whereby the rate of speed or "pace," as it is termed, of the bicycle shall be indicated.

It is also the purpose of this invention to obtain a machine whereby the rate of speed at which any vehicle (other than a bicycle) to which the machine is properly attached is traveling.

The machine embodying my invention can be constructed in various ways, two of such ways being hereinafter fully described, and illustrated in the drawings accompanying and forming a part hereof; but however it is constructed means for obtaining the action of centrifugal force on liquid is an essential feature of the machine—that is to say, I rely upon the effect of revolving a glass tube or cylinder partially filled with liquid and the determination of the number of revolutions per minute by the disposition of such liquid in the tube or cylinder, combined with means for indicating the position of the liquid in the tube or cylinder.

Figure 1:
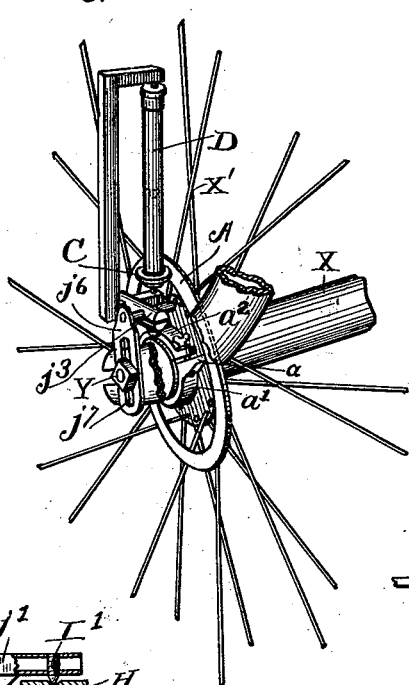
Figure 4:
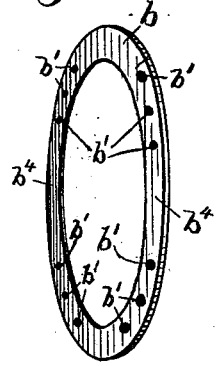
Figure 5:
Figure 2:
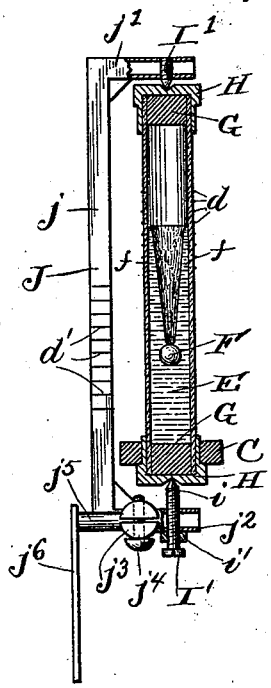
Figure 3:
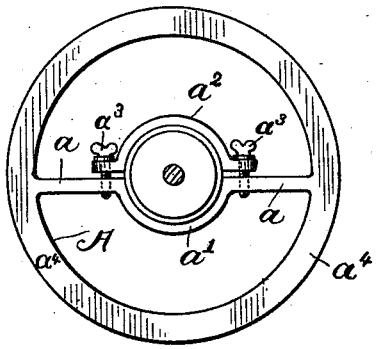

In the drawings referred to, Figure 1 is a perspective view of the pace-indicator embodying my invention and of a part of a front fork and wheel of a bicycle, to which fork the pace-indicator is attached. Fig. 2 is a central section, partly in elevation, of the device. Fig. 3 is a face view of a circular rim attached to the hub of a wheel and used to transmit movement from the wheel to the device. Fig. 4 is a perspective view of a modification of the circular rim illustrated in Fig. 3. Fig. 5 is a detail edge view of a portion of the ring illustrated in Fig. 4, with a view of one of the clamps on the rim shown attached to the spoke of a bicycle-wheel; and Fig. 6 is an elevation of a modification of the construction illustrated in Figs. 1 and 2.

A letter of reference applied to a given part is used to indicate such part throughout the several figures of the drawings wherever the same appears.

A, Figs. 1 and 3, is a wheel connected to and rotated by the front wheel of a bicycle.

Where the pace-indicator is attached to a vehicle other than a bicycle there may be intermediate connections for revolving wheel A between such wheel and the one of the wheels of the vehicle from which motion is to be transmitted to such pace-indicator.

For certain bicycles I prefer to construct wheel B, Fig. 4, for attachment to the one of the bicycle-wheels from which motion is to be transmitted to the pace-indicator.

Wheel A consists of the bar $a$, forming the spokes of the wheel, curved, as at $a'$, to fit reasonably close to the hub of the bicycle-wheel, part $a^2$ adjustably secured to the bar $a$ by screws $a^3$ $a^3$, and with face $a^4$ arranged to come in contact with the periphery of wheel C, and by frictional contact therewith produce rotation thereof.

Wheel B consists of ring $b$, having holes $b'$ $b'$ $b'$ therein, clamping-pieces $b^2$ $b^2$, screws $b^3$ $b^3$, and face $b^4$, such face coming in frictional contact with wheel C when the wheel B is properly secured on a bicycle-wheel by securing the spokes X′ in place between ring $b$ and clamping-pieces $b^2$ $b^2$ by screws $b^3$ in holes $b'$ $b'$.

D is a rotatably-mounted cylinder or tube. Wheel C is attached to tube D or to one of the hereinafter-described heads thereof. Frictional contact of face $a^4$ of wheel A or face $b^4$ of wheel B with the periphery of wheel C is all that I find necessary to obtain the required rotation of the rotatable tube or cylinder D.

E indicates the liquid contents (preferably a heavy oil or mercury) of rotatable tube or cylinder D, and F is an indicator by means of which the position of such liquid contents may be shown. I prefer where indicator F is used that it shall consist of a piece of burnt or charred cork, as when so made it will float upon the surface of the main body of liquid E, can be readily seen, and will not adhere to the walls of the rotatable tube or cylinder D.

$f\ f$ indicate a portion or part of the liquid contents of the rotatable tube or cylinder D thrown against the walls thereof and there maintained by the rotation at a given speed of such rotatable tube or cylinder in the forward movement of the bicycle.

Rotatable tube or cylinder D should be constructed of glass, so the contents thereof may be observed, and in such case the lower end of the inverted cone obtained (in appearance) by the rapid rotation of the tube or cylinder is readily observable and without the indicator F. Hence I prefer not to use such indicator. The lower end of such inverted cone is accurately determined by means of the marks $d\ d$ on the outside of rotatable tube or cylinder D.

Where the cork is used as an indicator F, the faster the rotatable tube or cylinder D is revolved by the rotation of the wheel of the vehicle actuating it the lower will be its position, the exact position of such indicator being readily observed by reference to marks $d\ d\ d$ on the tube or marks $d'\ d'$ on the frame J, hereinafter described.

Where no indicator is used, the bottom of the cone, being compared with the marks $d\ d$ or $d'\ d'$, gives a readily-observable means of ascertaining the speed of the bicycle or other vehicle to which the pace-indicator is attached.

G G are corks inserted in the ends of tube or cylinder D, whereby the tube or cylinder is sealed.

H H are heads extending over the ends of the tube or cylinder, such tube or cylinder being secured in such heads. Recesses $h\ h$ may be made sufficiently large to permit the balls I I to be placed therein, as in Fig. 6, as well as the pivots I' I', or, if preferred, the recesses may be made to fit reasonably close to pivots I' I'. To permit adjustment of the bearings of the tube D, pivots I' I' extend through arms $j'\ j^2$ of the frame J, and the lower one of the pivots is made adjustable by having screw-threads $i$ thereon, fitting into corresponding screw-thread in arm $j^2$ of frame J, with jam-nut $i'$ to maintain the pivot in its adjusted position.

Frame J consists of vertical, or nearly so, part $j$, having upper arm $j'$, the lower arm $j^2$, the horizontal post $j^3$, secured at one end thereof to arm $j^2$, and having arm $j^5$ extending therethrough at the other end thereof. $j^6$ is a base having slot $j^7$ therein, and arm $j^5$ is secured to such base. The end of post $j^3$, through which arm $j^5$ extends, is split and has the tightening screw or bolt $j^4$ therein. Base $j^6$ is secured to the bicycle by tightening the nut Y against it. The construction illustrated in Figs. 1, 2, and 3 is adjusted by moving the post $j^3$ on arm $j^5$, so that wheel C is in proper contact with the driving-wheel A, (or B, if preferred.)

In the modification illustrated in Fig. 6, L is the base of the device, having a slot therein, (indicated by dotted lines $l\ l$,) through which slot the shaft of the bicycle extends. Base L is secured to the bicycle in the same way as is base $j^6$ of frame J. M is a frame pivotally secured to base L by pivot $m$. D is a glass tube or cylinder (identical in construction with tube D in Figs. 1, 2, and 3) rotatably mounted in frame M. $d\ d\ d\ d$ are marks on tube or cylinder D by which the lower end of the inverted cone obtained (in appearance) in the revolution of the tube D is indicated. H H are the heads of tube D in this modification, the same as in the first-described construction, and $h\ h$ are recesses in such heads. I I are balls in recesses $h\ h$, and I' I' are pivotal bearings in such recesses. Wheel C is mounted on the tube D in this modification, arranged to come in contact with the face $a^4$ or $b^4$ of wheels A and B, respectively, as preferred. N is a spring secured by pin $n$ to frame M and abutting at the other end against the lower end of base L, tending to hold the wheel C in yielding contact with the driving-wheel thereof. The adjustment required in frame J (by means of the split post $j^3$ on arm $j^5$) is thus obviated, and the wheel C is at all times in frictional contact with the driving-wheel.

The operation of the pace-indicator embodying my invention is: Wheel A rotates in unison with the front wheel of the bicycle and produces corresponding revolution of rotatable tube or cylinder D on its bearings. The rotation of the tube D causes rotation of the contents thereof, and by centrifugal force the liquid, preferably a heavy oil—as, say, castor-oil—in the tube adjacent to the walls thereof will rise and the liquid in the axial center of the tube will correspondingly fall. The float F, where used, will fall and the position of such float, considered relatively with the marks $d'\ d'$, will indicate the speed or pace of the bicycle. The greater the speed or pace of the bicycle the lower will be the position of the float, and where there is no float the lower will be the lower end of the inverted cone apparently formed in the tube D, and by comparison thereof with the marks $d\ d$ (or $d'\ d'$) on the tube D or frame J, respectively, the rate of speed of the bicycle will be indicated.

The device can be attached to any other vehicle and so connected that the speed of the revolving wheels thereof, or some one of them, will be indicated by the means last hereinbefore described.

In putting the liquid E in the tube or cylinder D, I have so far found it necessary to heat such liquid before putting the corks G G in the ends of the tube, in order to avoid breakage of the tube when the device is placed in positions where high temperature prevails.

Having thus described my invention, what I claim as new, and desire to secure by Letters Patent, is—

1. A pace-indicator consisting of a base, a frame movably mounted relative thereto on the base, a tube containing liquid therein rotatably mounted in the movable frame means for indicating the position of the liquid as affected by centrifugal force, a driving-wheel for producing rotation of the tube corresponding with the rotation of the wheel of the vehicle to which the pace-indicator is attached; with a spring interposed between the base and the frame, such spring tending to hold the rotatable tube in yielding contact with the driving-wheel; substantially as described.

2. In a pace-indicator the combination of a base, a frame pivotally secured to the base, a tube containing liquid partially but not wholly filling such tube, heads on the ends of the tube having recesses therein, pivotal bearings in the frame extending into the recesses in the heads, marks indicating the position of the liquid contained therein, a spring extending between the base and the frame, a wheel connecting with the tube and held in contact by the spring with a driving-wheel, and a connection between the driving-wheel and the wheel of the vehicle the speed whereof is to be indicated by the device; substantially as described.

ALBERT B. HOLSON.

In presence of—
FLORA L. BROWN,
CHARLES T. BROWN.